United States Patent
Francis et al.

(10) Patent No.: US 7,134,811 B2
(45) Date of Patent: Nov. 14, 2006

(54) HELICAL END MILL TYPE CUTTER CONFIGURED TO COMPENSATE FOR RADIAL RUNOUT

(75) Inventors: Mark A. Francis, Solon, OH (US); Kenneth G. DeRoche, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/692,613

(22) Filed: Oct. 24, 2003

(65) Prior Publication Data

US 2005/0089379 A1    Apr. 28, 2005

(51) Int. Cl.
*B23C 5/20* (2006.01)

(52) U.S. Cl. .......................... 407/42; 407/62
(58) Field of Classification Search ................ 407/34, 407/42, 47, 51, 53, 61–63; *B23C 5/20*
See application file for complete search history.

(56) References Cited

U.S. PATENT DOCUMENTS

| | | | |
|---|---|---|---|
| 3,672,017 A | | 6/1972 | Nielsen et al. |
| 4,050,128 A | * | 9/1977 | Lange .......................... 407/59 |
| 4,285,618 A | | 8/1981 | Shanley, Jr. |
| 4,681,485 A | * | 7/1987 | Koelewijn .................... 407/42 |
| 4,714,383 A | * | 12/1987 | Shimomura et al. .......... 407/42 |
| 4,790,693 A | * | 12/1988 | Koblesky ..................... 407/35 |
| 5,083,887 A | * | 1/1992 | Dotany ........................ 407/59 |
| 5,123,786 A | | 6/1992 | Yates et al. |
| 5,425,603 A | * | 6/1995 | Dutschke et al. .............. 407/40 |
| 5,586,843 A | | 12/1996 | Minicozzi |
| 5,904,449 A | * | 5/1999 | Satran et al. .................. 407/59 |
| 5,913,644 A | * | 6/1999 | DeRoche et al. .............. 407/42 |
| 5,944,456 A | | 8/1999 | Shirley et al. |
| 5,947,649 A | * | 9/1999 | Arai et al. ..................... 407/34 |
| 6,322,296 B1 | * | 11/2001 | Wetli et al. .................... 407/42 |
| 6,345,941 B1 | | 2/2002 | Fang et al. |
| 6,602,029 B1 | * | 8/2003 | George ........................ 408/230 |
| 6,659,694 B1 | * | 12/2003 | Asbell et al. .................. 407/40 |
| 6,773,209 B1 | * | 8/2004 | Craig ........................... 407/63 |
| 6,976,811 B1 | * | 12/2005 | DeRoche et al. .............. 407/56 |
| 2003/0223828 A1 | * | 12/2003 | Craig ........................... 407/35 |
| 2004/0258489 A1 | * | 12/2004 | Volokh ......................... 407/53 |

FOREIGN PATENT DOCUMENTS

| | | | | |
|---|---|---|---|---|
| DE | 3314049 A1 | * | 10/1984 |
| DE | 3800747 A1 | * | 7/1989 |
| DE | 4137230 A1 | * | 5/1993 |
| JP | 63-84810 A | * | 2/1984 |
| JP | 2000-135617 A | * | 1/1991 |

* cited by examiner

*Primary Examiner*—Daniel W. Howell
*Assistant Examiner*—Sara Addisu
(74) *Attorney, Agent, or Firm*—Larry R. Meenan

(57) ABSTRACT

An end mill type rotary cutting tool and associated cutting inserts that collectively compensate for radial pocket runout, thereby eliminating overlap marks in a machined work piece. The tool has pockets arrayed in helical flutes such that after one insert has abraded the work piece, a subsequent flute makes an overlapping pass. The inserts are so mounted in the cutting tool and have curved corners configured such that no degree of pocket runout due to manufacturing tolerances will cause any portion of the cutting edge of any insert to form an incuse cut in the work piece which penetrates the machined surface by more than the manufacturing tolerance. Thus overlap of inserts eliminate outward projections in the machined work piece and dimensions and configuration of the inserts and their pockets eliminate inward gouges, thereby eliminating visible overlap marks in the work piece.

7 Claims, 4 Drawing Sheets

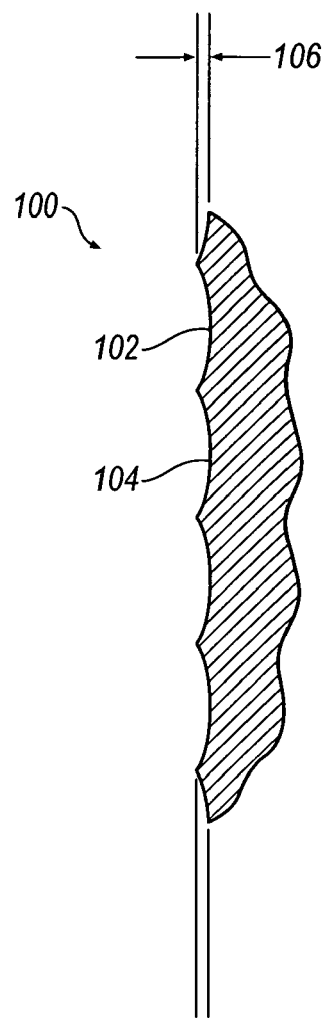
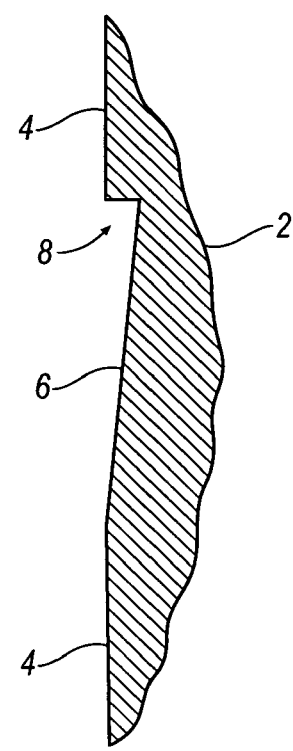
FIG. 3
FIG. 4
(PRIOR ART)

HELICAL END MILL TYPE CUTTER CONFIGURED TO COMPENSATE FOR RADIAL RUNOUT

BACKGROUND OF THE INVENTION

1. Field of the Invention

The present invention relates to machine tools for shaping a work piece, and more particularly to a system including a rotary cutter and associated cooperating cutting inserts.

2. Description of the Related Art

When machining a work piece utilizing rotary cutters provided with replaceable inserts, it is frequently desirable to impart a final finish in which marks such as discernible ridges due to machining have been eliminated. Such marks may not be objectionable in rough or coarse machining, but are objectionable in fine finishing work. These marks are produced incidentally in machining operations, and result from the relation of cutting edges of the inserts to the work piece. In most cutters such as end mills, tool design emphasizes efficiency and productivity, with little regard for fineness of finish of a machined work piece.

Nonetheless, the machine tool industry has appreciated that steps such as eliminating machining steps or operations provides economic benefits. One such area which may be improved is that of eliminating overlap marks. Illustratively, U.S. Pat. No. 5,944,456, issued to Shirley et al. on Aug. 31, 1999, and of common ownership with the present invention, shows an end mill type cutter having staggered, overlapping inserts having radiused corners. Peak shaving of the work piece results in improved finishing characteristics as regards undesirably high peaks or ridges, which would otherwise detract from the finished appearance.

However, it is possible for end mill cutters to suffer from leaving lap lines due to carving out valleys or inwardly projecting marks in the work piece, as well as carving out peaks. This may arise due to variations in manufacturing tolerances, which variations may for example cause inserts to display radial runout, or project to unintended degrees from the hypothetical cylindrical envelope or outer surface of a rotary cutter. Radial runout is defined as the variation in the radius between a cylinder or circle and a perfectly uniform or straight cylinder configuration or circle. Runout is apt to gouge out unintended valleys which appear as undesirable conspicuous lap lines. Overlapped, staggered inserts in and of themselves cannot overcome such detractions to otherwise superlative finishes, as staggering can reduce peaks but cannot compensate for overly deep valleys. This situation is depicted in FIG. 4, wherein a representative work piece 2 has ideal upper and lower facets 4, which would result from perfect alignment of cutting inserts (not shown) having flat cutting edges, and one misaligned facet 6, which could result from an insert (not shown) which is misaligned due to radial runout of its associated pocket. In the situation illustrated, the degree or magnitude of radial runout does not exceed the manufacturing tolerances.

It will clearly be seen that an overlap mark 8 exists where the insert which cut facet 6 passed over work piece 2. This overlap mark 8 is highly conspicuous, and mars what would otherwise be an acceptable finish. There remains a need in the art for a rotary cutter which can control both excessive peaks and also excessive valleys formed in machined surfaces.

SUMMARY OF THE INVENTION

Briefly, according to this invention, there is provided an advance over known designs by introducing, in a rotary cutting tool bearing inserts, compensation for radial runout resulting in disturbances to the plane of contact established by the rotary cutting tool with a work piece, where radial runout arises from manufacturing tolerances. This is accomplished in the present invention by establishing certain interrelationships between the cutting tool and its associated inserts, and imparting certain configurational characteristics to the inserts.

The inserts, which could otherwise be configured as parallelpipeds, are formed with slightly rounded or "radiused" corners. The degree of rounding cooperates with orientation of the insert within an associated pocket formed in the cutting tool such that minor misalignment of the insert from an ideal orientation will not cause overlap marks in the form of gashes or other incuse removal of material in the work piece. The curved profile of the insert, as viewed in plan, bears a relationship to manufacturing tolerances such that an insert, particularly at the corners, never projects from the cutting tool sufficiently to abrade the work piece beyond a predetermined limit, with the consequence that incuse or inwardly projecting lap marks are eliminated. When this arrangement is combined with overlapping of succeeding inserts, both externally and internally projecting lap marks are eliminated. The result, achieved in only one pass by a cutting tool using inserts, is a finish which satisfies final surface finish standards, unmarred by overlap marks.

It is, therefore, a feature of the invention to impart a final finish to a machined work piece in a single pass of a rotary cutting tool provided with cutting inserts.

In particular, it is a feature of the invention to eliminate both internally and externally projecting lap marks which might otherwise be caused by misalignment of subsequently passing inserts, due to manufacturing tolerances in the cutting tools.

It is another feature of the invention to provide improved elements and arrangements thereof by apparatus for the purposes described which is inexpensive, dependable, and fully effective in accomplishing its intended purposes.

These and other features of the present invention will become readily apparent upon further review of the following specification and drawings.

BRIEF DESCRIPTION OF THE DRAWINGS

Further features of the present invention, as well as the advantages derived therefrom, will become clear from the following detailed description made with reference to the drawings in which:

FIG. 3 is a side elevational, cross sectional view of part of a work piece which has been machined by the tool of FIG. 1;

FIG. 4 is a side elevational, cross sectional view of part of a work piece which has been machined by a prior art tool in a manner corresponding to that of FIG. 3;

DESCRIPTION OF THE PREFERRED EMBODIMENT

Figure 1:
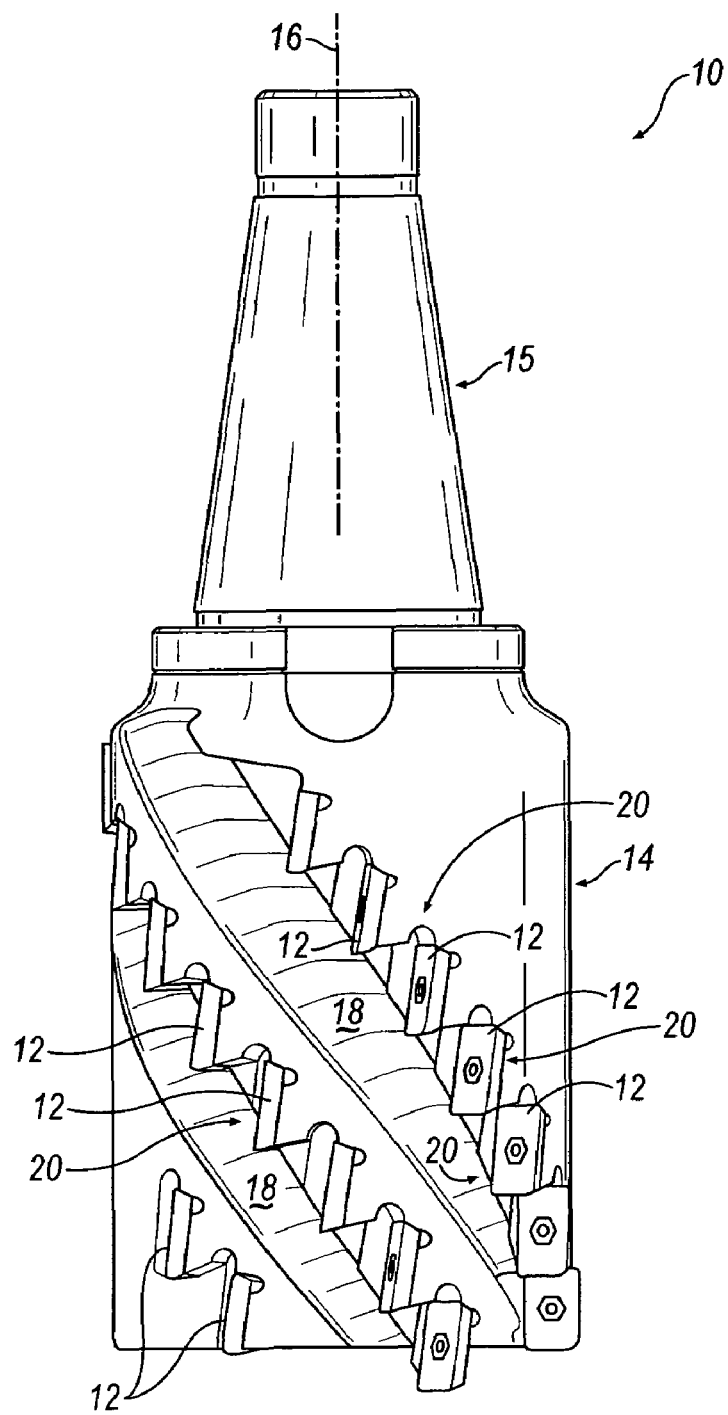
FIG. 1 is a side elevational view of one embodiment of a rotary cutting tool according to the present invention.

Referring to the drawings, wherein like reference characters represent like elements, there is shown in FIG. 1 a rotary cutting tool 10 with an associated set of cutting inserts 12 shown installed within tool 10. Tool 10 has a body 14 which is generally radially symmetrical about its rotational axis 16. Body 14 is preferably cylindrical, and abuts a shank 15. Body 14 and shank 15 share common rotational axis 16. Body 14 preferably but not necessarily includes a plurality of flutes 18 each bearing a plurality of pockets 20 therein. Each pocket 20 is configured and dimensioned to receive at least one, but possibly more, of the inserts 12. Inserts 12 are configured and dimensioned to be received within and secured to the pocket 20.

Pockets 20 are arranged to seat a plurality or series of axially and circumferentially displaced, generally parallel inserts 12. That is, pockets 20 are arrayed in columns, as seen in the depiction of FIG. 1, wherein one pocket 20 is in close proximity to but slightly displaced to the right or left along the circumference of body 14, of an adjacent pocket 20. Also, each pocket 20 which is to the left of an adjacent pocket 20 is also higher on body 14 than that pocket 20 to the right. Thus, it may be the that adjacent pockets 20 form a series of axially and circumferentially displaced pockets 20. The same pockets 20 are parallel so that cutting edges of inserts 12 will be parallel to one another, to assure continuous and even cutting action relative to a work piece. To this end, flutes 18 are helically arranged about the circumferential surface of body 14, with pockets 20 being disposed within flutes 18. Within any one flute 18, pockets 20 are helically arrayed along the length of body 14, are arranged such that adjacent axially and circumferentially displaced inserts 12 overlap one another slightly along their respective lengths.

Figure 2:
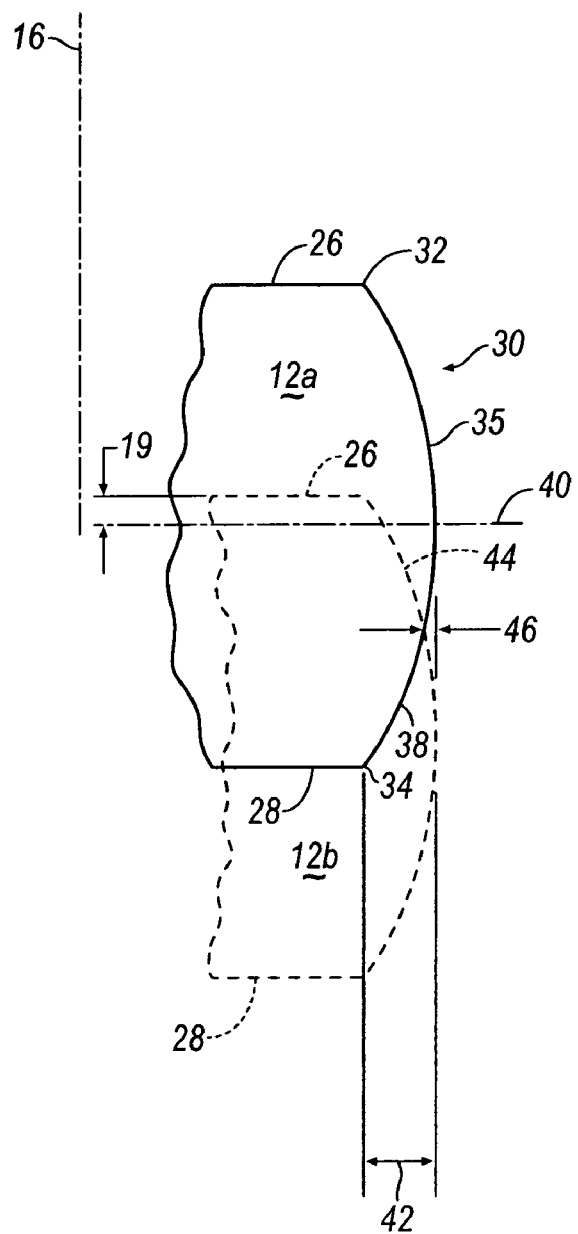
FIG. 2 is an exaggerated, diagrammatic detail view of two adjacent inserts drawn as though their respective pockets were unrolled from the cylindrical configuration of the tool of FIG. 1, and drawn to larger scale than FIG. 1.

Overlap is clearly seen in FIG. 2, wherein insert 12A is installed in a pocket 20 of one flute 18, and insert 12B (shown in broken lines) is installed in a pocket 20 of a second flute 18. FIG. 2 depicts how the silhouettes of inserts 12A and 12B would overlap one another when rotary cutting tool 10 is rotated about axis 16. Also referring to FIG. 3, cutting contact generated by insert 12A made with work piece 100 overlaps cutting contact generated by insert 12A made with work piece 100. Cutting contact occurs when rotary cutting tool 10 is both rotated and also brought to bear against work piece 100 by moving tool 10 laterally there against. This results in formation of scalloped cuts or kerfs 102 and 104. It will be apparent that repeated passes of additional inserts 12 will continue the pattern of scalloped cuts 102, 104 formed by inserts 12A, 12B according to the number of available inserts 12.

Figure 5:
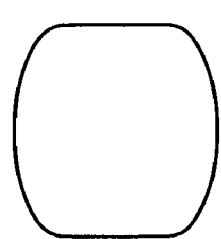
FIG. 5 is a plan view of an alternative embodiment of an insert usable with the rotary cutting tool of FIG. 1.

Returning to FIG. 2, insert 12A has a first end 26 and a second opposed end 28, and at least one cutting edge 30 spanning ends 26 and 28. A first corner 32 is formed at the juncture of cutting edge 30 and first end 26, and a second corner 34 formed at the juncture of cutting edge 30 and second end 28. Each cutting edge 30 has a first tapered section 36 extending from corner 32 part way to corner 34, and a second tapered section 38 extending from the second corner 34 part way to first corner 32 forming a highpoint 43 therebetween. In the preferred embodiment, taper is imparted by curvature of a single or constant radius. This produces the convex curved configuration shown in FIG. 2. However, and as illustrated in FIG. 5, it would also be possible to utilize convex curved configuration is that of a variable radius curve.

Figure 6:
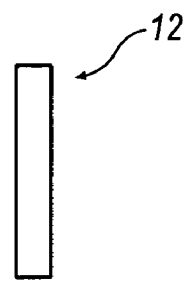
FIG. 6 is a side elevational view of an insert usable with the rotary cutting tool of FIG. 1.

In most cases, tapered sections 36 and 38 are not distinct from one another, designation as different sections being merely for semantic convenience. Similarly, corners 32 and 34 need not be discrete intersections of sides forming points, designation of corners again being a semantic convenience to facilitate explanation of the invention. Although inserts 12 of the embodiment of FIGS. 1 and 2 are bilaterally symmetrical about center line 40, they could be asymmetric if desired. Although not shown, in the preferred embodiment, inserts 12 are also symmetrical about their length, having a second cutting edge not seen in the partial detail of FIG. 2, so that they are indexable. An indexable insert 12 is substantially a parallelepiped when viewed in side elevation, as seen in FIG. 6.

Tool 10 is fabricated to a predetermined dimensional tolerance, as is customary in manufacturing. Of critical interest to the present invention, each pocket 12 displays a maximum radial runout dimension (not separately shown). Taper of tapered sections 36 and 38 is of magnitude and configuration which assure that depth of cutting of the work piece performed by either tapered section 36 or 38 will never exceed in magnitude the predetermined dimensional tolerance. Therefore, taper of tapered sections 36 and 38 each establish radial runout compensation for their respective halves or sections of their associated insert 12. Maximum outward radial displacement of a corner 32 or 34 of an insert 12 from rotational axis 16 is less than the magnitude of the predetermined manufacturing tolerance. Alternatively stated, radial runout compensation dimension 42, which is defined as the distance between the highpoint 43 and the corner 32 or 34 of an insert 12, is greater than the magnitude of the predetermined manufacturing tolerance. As shown in FIG. 2, the first and second corners 32, 34 of each insert 12 lie within a nominal cutting diameter when tool 10 is rotated about the rotational axis 16. In addition, the highpoint 43 of cutting insert 12a and corner 32 of cutting insert 12b are substantially circumferentially aligned with each other when tool 10 is rotated about the rotational axis 16. Similarly, the highpoint 43 of cutting insert 12b and corner 34 of cutting insert 12a are substantially circumferentially aligned with each other when tool 10 is rotated about the rotation axis 16. Accordingly, maximum penetration of cutting edge 30 into the work piece is limited to less than the maximum radial runout dimension characteristic of pockets 20 by fabrication thereof when tool 10 is rotated and brought to bear laterally against a work piece.

FIG. 2 shows other characteristics of the novel configuration and arrangement of inserts 12. It will be seen from examining FIG. 2 that inserts 12A and 12B are arranged such that cutting contact made with the work piece by insert 12A overlaps cutting contact made with the work piece by insert 12B, which subsequently passes the kerf left by insert 12A, by more than half of the length of cutting edge 30 of insert 12A. The degree of overlap exceeds half the length of insert 12A by the magnitude of arrow pair 19. This relationship holds true for all inserts 12. A consequence of this relationship as illustrated in FIG. 3, where it is seen that scalloped cuts or kerfs 102 are not as deep as radial runout compensation dimension 42. Depth of cuts 102 is indicated by arrow set 106.

Again referring to FIG. 2, cutting contact with a work piece of insert 12A intersects cutting contact with the work piece by subsequently passing insert 12B at the intersection of first tapered section 44 of insert 12B with second tapered section 38 of insert 12A. Of course, cutting contact will occur only after rotary cutting tool 10 is rotated and brought to bear laterally against the work piece. In a representative tool 10 having a manufacturing tolerance of 0.002 inch, the magnitude of a deviation dimension indicated by arrow pair 46 would be 0.0002 to 0.0005 inch. In the same tool 10, the magnitude of radial runout compensation dimension 42 would be, for example, 0.003 inch.

The net effect of combining overlap of subsequently passing inserts with tapering as described is that overlapping cutting contact of inserts 12 made with the work piece and taper of inserts 12 combine to eliminate both inwardly projecting lap marks and outwardly projecting lap marks which could otherwise be formed in the course of machining the work piece. As seen in FIG. 3, a series of cuts or kerfs (e.g., 102, 104) characterize the machined surface of work piece 100. The entire surface is free from cuts as deep as overlap mark 8, shown in FIG. 4. Thus, an acceptable finish is imparted by rotary cutting tool 10 in a single pass. Subsequent fine finishing operations are eliminated.

The invention may be considered as a method of arranging a rotary cutting tool and associated set of cutting inserts to eliminate overlap marks in machined work pieces. This method comprises steps of providing a rotary cutting tool 10 having pockets 20 each disposed to receive at least one insert 12; arraying pockets 20 in overlapping fashion such that an insert 12 installed in one pocket 20 generates overlapping cutting contact made with a work piece relative to cutting contact made with the work piece by a subsequently passing insert 12 when rotary cutting tool 10 is rotated and brought to bear laterally against the work piece; limiting a runout tolerance of each pocket 20 to a predetermined magnitude; configuring each insert 12 to have a lateral cutting edge 30 including tapered portions 36, 38 such that width of insert 12 is greatest at its center line 40, and that no part of insert 12 projects radially outwardly from rotary cutting tool 10 when insert 12 is installed in a pocket 20 by a dimension of magnitude greater than that of the runout tolerance of each pocket 20. The method is then used for end milling by rotating rotary cutting tool 10 and bringing tool 10 to bear laterally against a work piece until each cut made by an insert 12 has been subjected to a subsequent overlapping cut made by another insert 12. In the preferred embodiment, the invention is best practiced by forming at least two helical flutes 18 in rotary cutting tool 10 and locating pockets 20 along each one of the flutes 18. In the most preferred embodiment, a further step is practiced, that of locating at least some pockets 20 along any one of the flutes 18, and preferably for all pockets 20, such that the end of one pocket 20 overlaps the end of an adjacent pocket 20. It is also preferred to practice the step of locating at least some subsequently passing pockets 20 which are non-adjacent to one another such that each pocket 20 is overlapped by at least half the length of an insert 12 by a subsequently passing pocket 12.

The rotary cutting tool 10 and its inserts 12 will be understood to include suitable retention elements (not shown) for securing inserts 12 in place within their pockets 20 as well known in the art. These retention elements may include, for example, through holes having shoulders formed in inserts 12 and associated fasteners such as screws for passing through the holes. The retention elements may include clamps, as are known in the art, or any other suitable apparatus for retaining inserts 12 within their associated pockets 20.

It would be possible to provide a cutting tool that has pockets 20 arranged according the present invention, but without flutes. 18 (this embodiment is not shown). For example, each pocket 20 could have its own dedicated chip gully. However, location of pockets 20 within flutes 18 is preferred. It is further preferred to provide two or three flutes 18.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary cutting tool including a body having a rotational axis and a nominal cutting diameter, comprising:
    a first flute farmed in said body and including a first insert-receiving pocket;
    a second flute formed in the body and including a second insert-receiving pocket, the second insert-receiving pocket adjacent the first insert-receiving pocket;
    a first cutting insert mounted in the first insert-receiving pocket;
    a second cutting insert mounted in the second insert-receiving pocket,
    each cutting insert including a first end, a second end, a centerline disposed midway between the first and second ends, a cutting edge spanning between the first end and the second end, a first corner formed at the juncture of the cutting edge and the first end, and a second corner formed at the juncture of the cutting edge and the second end, the cutting edge defined by a first tapered section and a second tapered section, the first tapered section and the second tapered section forming a convex curved configuration of a constant radius defining a highpoint therebetween,
    wherein the first and second corners of each insert lie within the nominal cutting diameter when the cutting tool is rotated about the rotational axis, and
    wherein the highpoint of the first cutting insert and the first end of the second cutting insert are substantially circumferentially aligned with each other when the rotary cutting tool is rotated about the rotational axis.

2. The rotary cutting tool according to claim 1, wherein the first and second insert-receiving pockets are helically arranged along the length of the body.

3. The rotary cutting tool according to claim 1, wherein the first and second flutes are helically arranged along the length of the body.

4. The rotary cutting tool according to claim 1, wherein a difference in radial dimension as measured from the rotational axis of the cutting tool between the tapered cutting edge at the centerline of the first cutting insert and one of to first and second corners of the second cutting insert define a radial runout compensation dimension that is greater than a predetermined manufacturing tolerance of the rotary cutting tool.

5. The rotary cutting tool according to claim 4, wherein the predetermined manufacturing tolerance is approximately 0.002 inches, and wherein the radial runout compensation dimension is approximately 0.003 inches.

6. The rotary cutting tool according to claim 1, wherein the tapered cutting edge of the first cutting insert and the first and second corners of the second cutting insert define a deviation dimension such that a maximum outward radial displacement of the first and second corners of the second insert from the rotational axis is less than a magnitude of a predetermined manufacturing tolerance.

7. The rotary cutting tool according to claim 6, wherein the predetermined manufacturing tolerance is approximately 0.002 inches, and wherein the radial runout compensation dimension is approximately 0.003 inches.

* * * * *